(12) United States Patent
Lively et al.

(10) Patent No.: US 9,671,041 B2
(45) Date of Patent: *Jun. 6, 2017

(54) VALVE DEVICE AND FLUID COUPLING COMPRISED THEREOF

(71) Applicant: Dresser, Inc., Addison, TX (US)

(72) Inventors: Matthew Charles Lively, Riverton, UT (US); Lamar Edward May, Tooele, UT (US); Kenneth Marcell Graff, Murray, UT (US)

(73) Assignee: Dresser, Inc., Addison, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/004,897

(22) Filed: Jan. 23, 2016

(65) Prior Publication Data

US 2016/0138732 A1  May 19, 2016

Related U.S. Application Data

(63) Continuation of application No. 13/674,251, filed on Nov. 12, 2012, now Pat. No. 9,243,733.

(51) Int. Cl.
*F16K 5/00* (2006.01)
*F16K 47/04* (2006.01)
(Continued)

(52) U.S. Cl.
CPC ............ *F16K 47/04* (2013.01); *F16K 1/34* (2013.01); *F16K 1/46* (2013.01); *F16K 1/54* (2013.01);
(Continued)

(58) Field of Classification Search
CPC ....... F16K 1/38; F16K 1/46; F16K 1/54; F16K 5/0207; G05D 16/02
(Continued)

(56) References Cited

U.S. PATENT DOCUMENTS

| 670,083 A | 3/1901 | Osborne |
| 1,758,471 A | 5/1930 | Schmidt |

(Continued)

FOREIGN PATENT DOCUMENTS

| EP | 0064600 | 11/1982 |
| FR | 2742206 | 6/1997 |

(Continued)

OTHER PUBLICATIONS

PCT Search Report and Written Opinion dated Feb. 12, 2014 from related Application No. PCT/US2013/069216.

*Primary Examiner* — Matthew W Jellett
(74) *Attorney, Agent, or Firm* — Paul Frank + Collins P.C.

(57) ABSTRACT

Embodiments of a valve device that reduces noise and vibration that may occur during low flow conditions in fluid couplings (e.g., valves and flow regulators). These embodiments utilize a plug and seat arrangement with geometry to prevent pressure differentials that cause the plug element to open and close in a cyclic pattern. In one embodiment, the valve device includes a seat element with an aperture and a plug element with a boss that extends into the aperture when the plug element contacts the seat element. The boss has an outer surface that forms a gap, which defines an annular area proximate the point of contact between the seat element and the plug element that is sized to reduce Venturi flow effects that cause the cyclic pattern to occur.

20 Claims, 7 Drawing Sheets

(51) Int. Cl.
*F16L 29/00* (2006.01)
*F16K 47/00* (2006.01)
*F16K 1/46* (2006.01)
*F16K 1/54* (2006.01)
*G05D 16/02* (2006.01)
*G05D 16/10* (2006.01)
*F16K 1/34* (2006.01)

(52) U.S. Cl.
CPC ................ *F16K 5/00* (2013.01); *F16K 47/00* (2013.01); *F16L 29/00* (2013.01); *G05D 16/02* (2013.01); *G05D 16/10* (2013.01); *Y10T 137/9029* (2015.04)

(58) Field of Classification Search
USPC .......................................... 251/121, 122, 367
See application file for complete search history.

(56) References Cited

U.S. PATENT DOCUMENTS

| | | |
|---|---|---|
| 3,699,999 A | 10/1972 | Dunkelis |
| 3,767,164 A | 10/1973 | Robinson |
| 4,114,850 A | 9/1978 | Alamprese |
| 4,705,062 A | 11/1987 | Baker |
| 4,721,284 A | 1/1988 | Bankard |
| 5,549,136 A | 8/1996 | Drocco et al. |
| 6,041,814 A | 3/2000 | Kouketsu et al. |
| 6,698,449 B2 * | 3/2004 | Hall ........................ F16K 1/422 137/315.41 |
| 6,877,715 B2 | 4/2005 | Kajitani |
| 9,243,733 B2 * | 1/2016 | Lively ........................ F16K 5/00 |
| 2002/0033461 A1 | 3/2002 | Kajitani |

FOREIGN PATENT DOCUMENTS

| | | |
|---|---|---|
| GB | 1190651 | 5/1970 |
| GB | 2153973 | 8/1985 |
| JP | S5926683 | 2/1984 |

* cited by examiner

VALVE DEVICE AND FLUID COUPLING COMPRISED THEREOF

CROSS-REFERENCE TO RELATED APPLICATIONS

This application is a continuation of U.S. Ser. No. 13/674,251, filed on Nov. 12, 2012, and entitled "VALVE DEVICE AND FLUID COUPLING COMPRISED THEREOF," now U.S. Pat. No. 9,243,733, the content of which is incorporated herein by reference in its entirety.

BACKGROUND

The subject matter disclosed herein relates to flow regulating devices and, more particularly, to valves that operate under low flow conditions.

Many valves utilize a plug element and a seat element to regulate the flow of fluids (e.g., gas and liquid). When these types of valves are closed, the plug element rests against the seat element. This configuration prevents fluid flow through the valve. In some valves, changes in pressure of the fluid downstream of the valve can lift the plug element off the seat element. The displacement of the plug element causes the valve to open slightly, which forms a small gap between the bottom of the plug element and the top of the seat element. Often, fluid flows through the gap to supply the downstream demand, effectively equalizing the pressure across the valve.

Under certain flow conditions, the gap operates as a nozzle that induces a Venturi nozzle flow. This flow leads to localized changes in the velocity and pressure of the fluid as the fluid exits the nozzle. For example, low flow conditions (e.g., flow of 10% or less of maximum valve capacity) can cause the fluid pressure at the nozzle to drop below the pressure downstream of the valve. The pressure differential causes the valve to close rapidly. As a result of the rapid descent, the plug element may slam violently onto the seat element. In many cases, however, the upstream flow cannot satisfy the downstream demand before the valve closes. The resulting differential allows the valve to open again because the downstream pressure remains below the set-point of the valve. Inevitably, the valve will continue to open and close in a rapid cyclic pattern.

This pattern can generate a loud sound, or "buzz," that emanates from the valve. For flow devices (e.g., flow regulators) that incorporate these types of valves, the pattern can also induce vibrations that can lead to failure of the valve and, ultimately, damage to the valve, the flow device, and/or components upstream and downstream of the valve. This damage can lead to costly repairs and system downtime.

BRIEF DESCRIPTION OF THE INVENTION

This disclosure presents embodiments of a valve device with geometry that addresses the Venturi flow effect. The geometry relies on the relationship between the plug element and the seat element to modify the nozzle that forms due to movement of the plug element relative to the seat element. As a result, the plug element must move farther from the seat element in order for the valve to supply the downstream demand. The increase in distance between the plug element and the seat element, however, changes the direction of the Venturi nozzle flow to prevent the Venturi flow effect from upsetting the force balance of the plug element.

BRIEF DESCRIPTION OF THE DRAWINGS

Reference is now made briefly to the accompanying drawings, in which.

Where applicable like reference characters designate identical or corresponding components and units throughout the several views, which are not to scale unless otherwise indicated.

DETAILED DESCRIPTION OF THE INVENTION

Broadly, the discussion below focuses on improvements in valves and valve devices to reduce inadvertent noise, or "buzzing," that arises during low flow conditions. The improvements introduce geometries that aim to significantly reduce, and in some respects eliminate, certain flow conditions that prevail at localized regions of the valve. By managing these flow conditions, the proposed geometries prevent pressure drops at the localized regions that can induce a cyclic pattern of opening and closing of the valve device.

Figure 1:
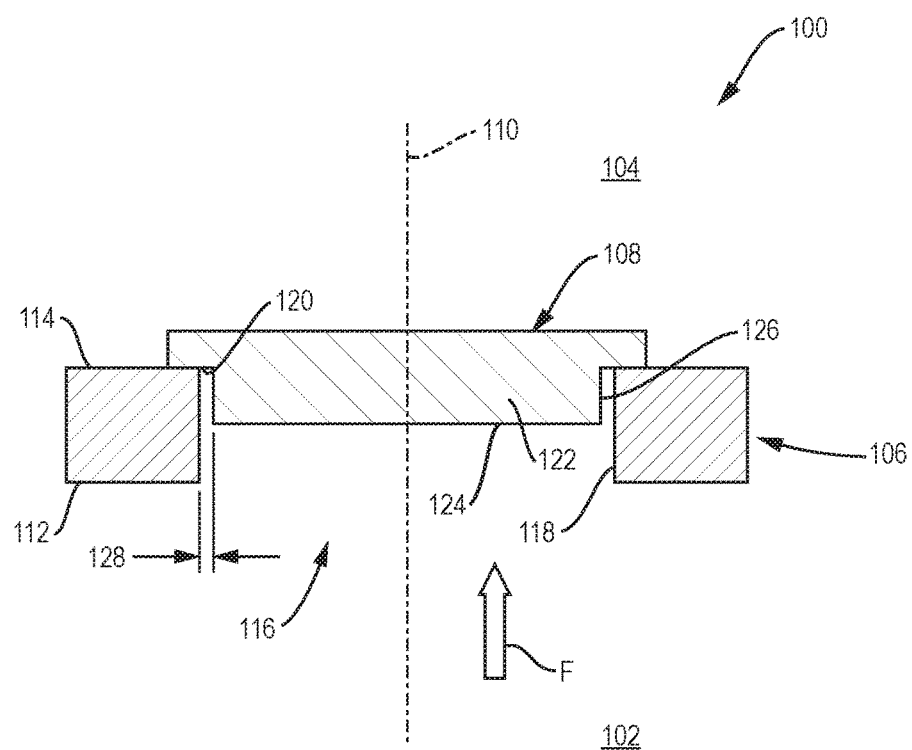
FIG. 1 depicts a schematic diagram of a side, cross-section view of an exemplary embodiment of a valve device in which the valve device is closed.

FIG. 1 provides a schematic diagram of an exemplary embodiment of a valve device 100 that reduces Venturi effects during low flow conditions. The valve device 100 has an upstream side 102 and a downstream side 104, the orientation of which depends on the direction of flow F of a working fluid (e.g., gas and/or liquid). The valve device 100 includes a seat element 106 and a plug element 108 that transits along a central axis 110 to a plurality of positions. In FIG. 1, the plug element 108 is shown in a first position in which the valve device 100 is closed, i.e., preventing flow F from flowing through the seat element 106 from the upstream side 102 to the downstream side 104.

In the illustrative orientation of FIG. 1, the seat element 106 has a bottom 112 (on the upstream side 102), a top 114 (on the downstream side 104), and an aperture 116 with an inner aperture surface 118. The plug element 108 has a contact surface 120 and a boss 122 that extends into the aperture 116. The boss 122 has a bottom 124 and an outer boss surface 126, which is spaced apart from the inner aperture surface 118 to form a gap 128. When the valve device 100 is closed, the contact surface 120 is disposed in contact with the top 114. In one example, the contact surface 120 may comprise material and/or an element (e.g., a gasket, o-ring, etc.) with properties to create and maintain a seal under pressure. This seal prevents flow F from flowing through the seal element 106, e.g., until the pressure of the working fluid on the upstream side 102 is greater than or equal to the pressure on the downstream side 104 and/or exceeds some external force (e.g., a spring force) that biases the plug element 108 onto the seat element 106.

Figure 2:
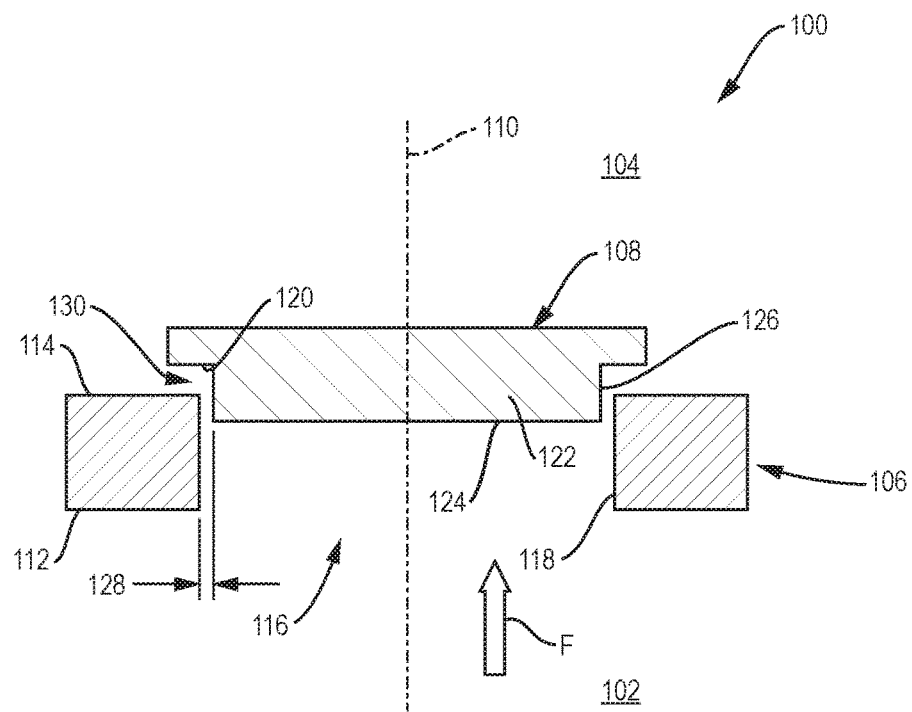
FIG. 2 depicts a schematic diagram of a side, cross-section view of the valve device of FIG. 1 in which the valve device is partially open.

In FIG. 2, the plug element 108 is shown in a second position, where the valve is partially opened to form a nozzle area 130 between the contact surface 120 of the plug element 108 and the top 114 of the seat element 106. This second position can occur during low flow conditions where the pressure on the upstream side 102 is greater than the pressure on the downstream side 104, but is not great enough to fully overcome a bias force (e.g., a spring force) internal to the valve. This bias force acts to maintain the plug element in its closed position. As discussed above, the pressure differential between the upstream side 102 and the downstream side 104 allows the plug element 108 to move away from the seal element 106. Movement of the plug element 108 in this manner forms the nozzle area 130. However, examples of the seat element 106 and the plug element 108 require the plug element 108 to lift higher off of the seat element 106 to supply the downstream demand. This feature reduces the likelihood that cyclic opening and closing (or "buzzing") of the plug element 108 will occur during low-flow conditions.

Figure 3:
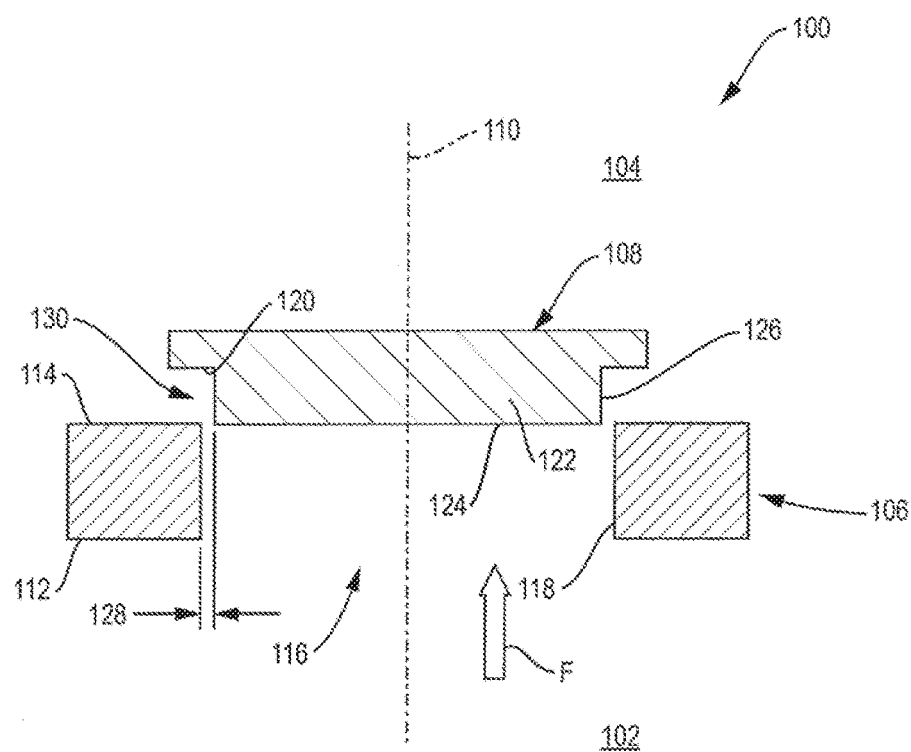
FIG. 3 depicts a schematic diagram of a side, cross-section view of the valve device of FIG. 1 in which the valve is open.

FIG. 3 depicts the plug element 108 in a third position, at which the bottom 124 of the plug element 108 is proximate and, in one example, at the same level as the top 114 of the seat element 106. A portion of the boss 122 is extracted from the aperture 116, thereby allowing the working fluid to flow through the seat element 106 with limited interference from the plug element 108. During some implementations, the plug element 106 can move further away, e.g., as the flow F develops and meets the downstream demand. In one example, and as set out in the embodiments below, the boss 122 may include features that provide a lead-in surface to properly realign the plug element should the flow cause radial displacement of the plug element 108. This displacement can cause mis-alignment that allows the bottom 124 of the boss 122 to contact the top 114 of the seat element. While the features to prevent this problem may be incorporated into the geometry of the boss 122, this disclosure contemplates construction of the plug element 108 that may include components that facilitate this alignment during return travel of the plug element 108.

Figure 4:
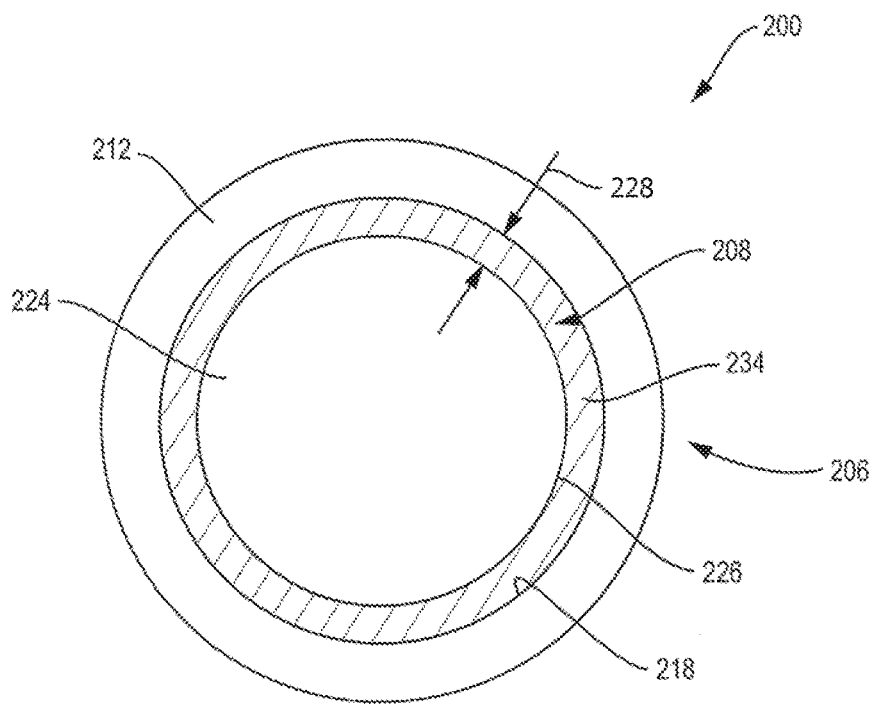
FIG. 4 depicts a bottom view of an exemplary embodiment of a valve device.

FIG. 4 illustrates a bottom view of a valve device 200 to further illustrate the improvements set forth above. As shown in FIG. 4, the gap 228 defines an annular area 234 that circumscribes a central axis (e.g., central axis 110 of FIG. 1). The annular area 234 allows the flow F (FIGS. 1, 2, and 3) to flow between the inner aperture surface 218 and the outer boss surface 224. This configuration allows flow to occur when the valve is partially opened, e.g., as shown in FIG. 2. In one example, the annular area 234 is about 2% or less of the aperture area of an aperture (e.g., aperture 116 of FIG. 1) proximate the top (e.g., top 114 of FIGS. 1 and 2) when the plug element 208 is in the first position.

The geometry of one or more elements of the valve 200 (e.g., the seat element 206 and/or the plug element 208) can determine the size of the annular area 234. For example, as discussed in connection with the examples below, the geometry of the plug element 208 can cause the annular area 234 to increase and/or decrease in connection with the position of the plug element 208 relative to the seat element 206. In one example, the annular area 234 changes by about 1% to about 20% from, respectively, the first position to the third position, e.g., when the plug element 208 moves from the first position to the third position.

Form factors for the elements of the valve device 200 can depend on the application, e.g., the type and/or geometry of the flow coupling. The form factor of FIG. 4 uses generally circular and/or cylindrical shapes. In other configurations, the form factor may utilize other shapes (e.g., rectangular, cubic, hexagonal, triangular, ellipsoidal, conical, etc.) for the aperture and the boss 222. Selection of the appropriate form factor may depend on characteristics of the working fluid, desired flow properties, size and space constraints for the flow coupling, etc.

Figure 5:
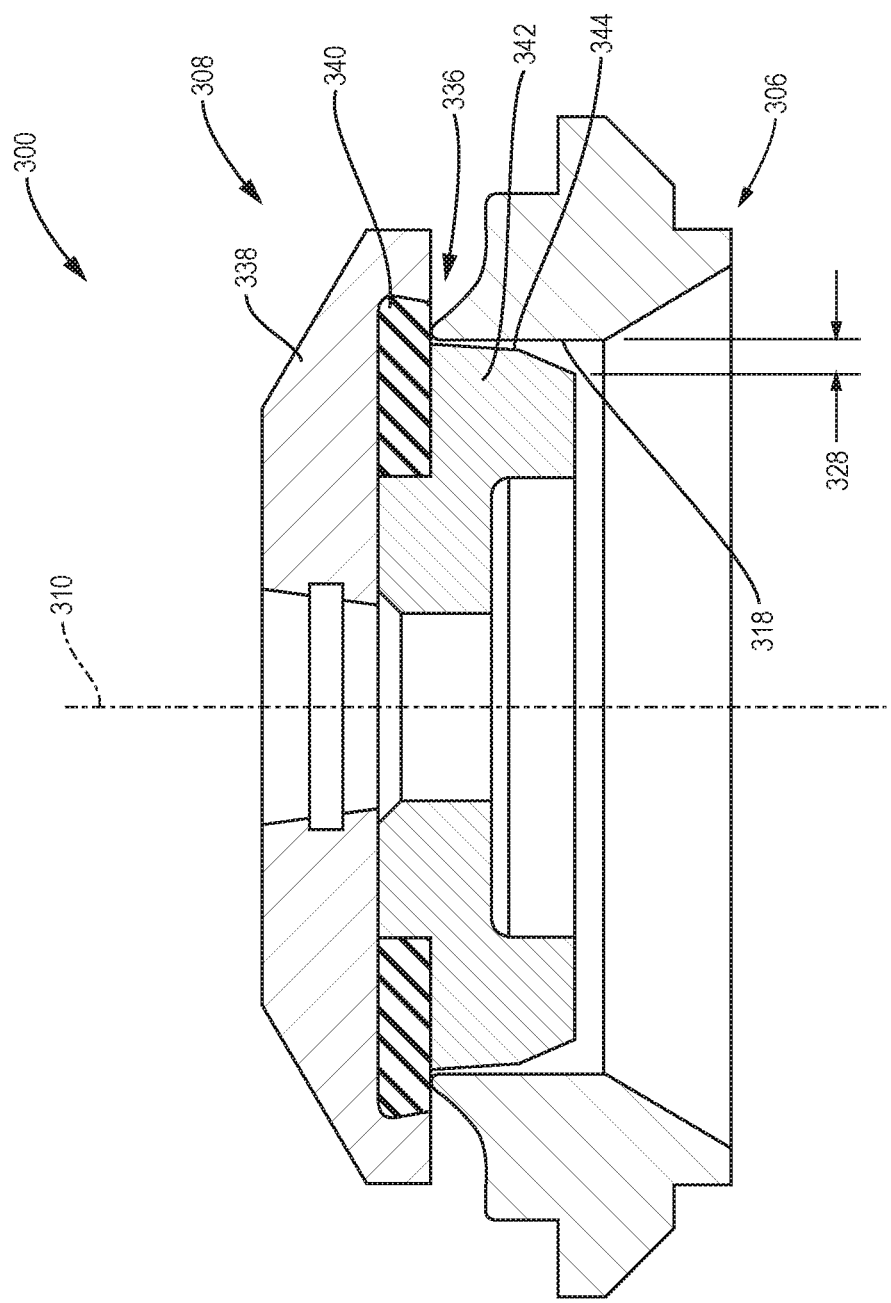
FIG. 5 depicts a side, cross-section view of an exemplary embodiment of a valve device.
Figure 6:
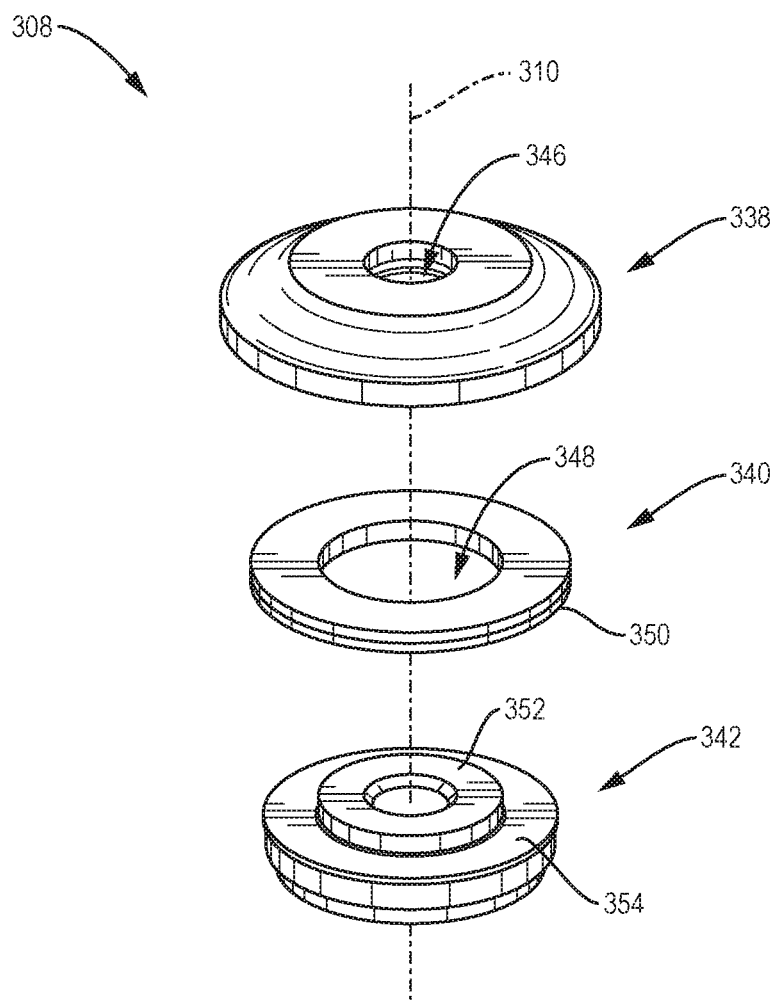
FIG. 6 depicts a top, perspective view of an example of a plug element for use in a valve device, e.g., the exemplary valve device of FIGS. 1, 2, 3, 4, and 5.
Figure 7:
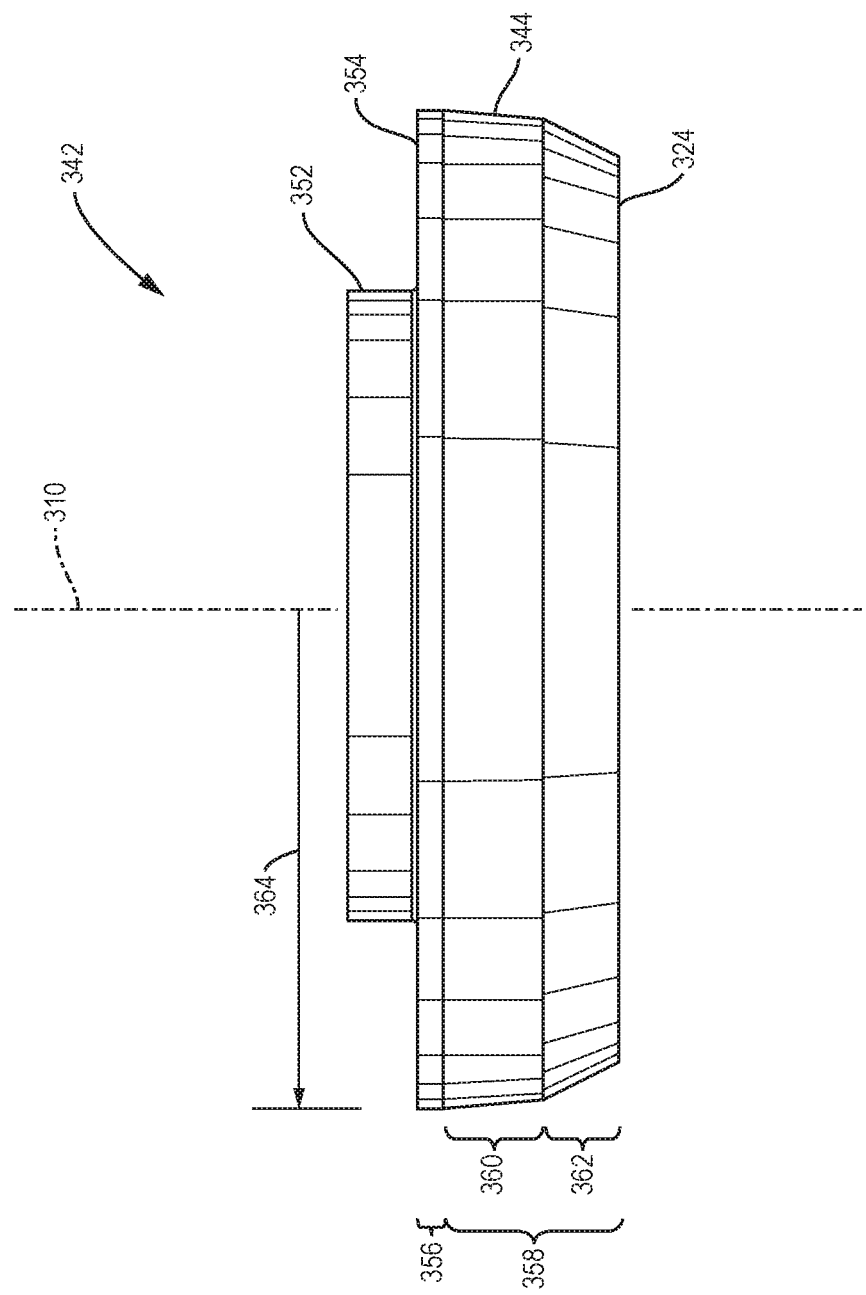
FIG. 7 depicts a side view of the plug element of FIG. 6.

FIGS. 5, 6, and 7 depict an exemplary embodiment of a valve device 300 to illustrate features of one exemplary form factor. In FIG. 5, the seat element 306 forms a seal feature in the form of a lip 336 with a curvilinear outer surface. The plug element 308 includes one or more plug components (e.g., a plug retainer 338, a seal 340, and an extension member 342). In one embodiment, the extension member 342 has an outer surface 344 with a profile that changes along the longitudinal axis 310. The profile forms one or more pre-determined angles and/or curvilinear slopes with one or more pre-determined radii with respect to the central axis 310.

Although shown as separate pieces, this disclosure contemplates configurations of the plug element 308 in which one or more of the plug retainer 338, the seal 340, and the extension member 342 are constructed monolithically as well. For example, the plug retainer 338 and the extension member 342 may be amenable to machining techniques that allow the geometry of these two components to develop from a single piece of material (and/or casting, molding, etc.). Exemplary materials for use as the plug element 308 and the plug retainer 342 are generally inert and/or do not corrode, erode, or show significant breakdown as a result of properties of the working fluid and the fluid dynamics that occur as the working fluid transits the valve device 300. These materials include brass and like metals, but can also comprise plastics and composites (alone and/or in combination with metals) that exhibit sufficient mechanical properties for use in the valve device 100.

As shown in FIG. 5, the plug retainer 338 forms the top, or downstream, portion of the plug element 308. This component can have features to receive and secure the other components, e.g., the seal 340 and/or the extension member 342. For example, the plug retainer 338 can incorporate a groove and/or shallow counterbore that can receive and position the seal 340 therein. This configuration exposes at least part of the seal 340 (e.g., a surface) at the bottom, or, downstream side of plug retainer 338.

When the valve device 300 is closed, the exposed part of the seal 340 can engage the lip 336 of the seat element 306. The engagement of these components creates a fluid-proof barrier to prevent the working fluid from moving through the valve device 300. Examples of the seal 340 can comprise compressible materials, e.g., rubber and like polymers, that are inert and/or do not react to the working fluid.

In one embodiment, the profile of the outer surface 344 defines the gap 328 between the outer surface 344 and the inner aperture surface 318. For example, the profile can define the dimensions (e.g., radius and/or diameter) of the outer surface 344 relative to the central axis 310. These dimensions can vary to increase and decrease the size of the gap 328 and, in one particular example, to ascribe the size of the annular area proximate the lip 336 (e.g., the annular area 234 of FIG. 4) as the plug element 308 moves among its plurality of positions (e.g., the first position, the second position, and the third position of FIGS. 1, 2, and 3).

FIG. 6 depicts a top, perspective view of the plug element 308 in exploded assembly form. As shown in FIG. 6, the plug retainer 338 has a through opening 346, which can receive a fastener and/or other cylindrical component therethrough. The seal element 340 forms a ring or gasket with an inner ring opening 348 and an outer ring surface 350. The extension member 342 has a boss member 352 that extends generally upwardly from a seal retaining surface 354.

Features of the plug retainer 338 and the extension member 342 are proposed to fit and position the seal 340 in the valve device 300. The seal 340 can fit over the boss member 352. In one example, the height of the boss member 352 allows the seal retaining surface 354 to contact the seal 340. The plug retainer 338 can have features to accommodate one or both of the inner ring opening 348 and the outer ring surface 350. For example, a groove feature in the plug retainer 338 will require an inner diameter and an outer diameter that allow the seal 340 to fit into the groove feature. Use of a bore feature in the plug retainer 338 need only consider the dimensions of the outer diameter.

Fits between the seal 340 and the features of the plug retainer 338 and the extension member 342 may be loose (e.g., where the dimensions of the features are larger than the dimensions of the seal 340) or may form an interference fit, where friction between the seal 340 and one or more surfaces of the plug retainer 338 and the boss member 352 help to secure the seal 340 in position. The assembly of the valve device 300 may also utilize a bonding agent (e.g., adhesive) to further retain the seal 340 in position.

Focusing the discussion now on the extension member 342, FIG. 7 illustrates a side view to further describe the improvements that can reduce cyclic buzzing during low flow conditions. In the example of FIG. 7, the profile of the outer surface 344 has a first section 356 and second section 358, which is upstream of the first second 356. The second section 358 can include one or more reduced diameter sections (e.g., a first reduced diameter section 360 and a second reduced diameter section 362). A radial dimension 364 defines the position of the outer surface 344 relative to the longitudinal axis 310 in the various sections.

In one embodiment, the first section 356 defines the portion of the outer surface 344 in which the radial dimension 364 remains constant (wherein the term "constant" includes variations in the surface by only a small amount (e.g., within manufacturing tolerances and/or within ±0.05 mm)). When the valve device 300 is in its closed and/or partially open positions, values for the radial dimension 364 in the first section 356 reduce the gap 328 (FIG. 5) to avoid formation of the Venturi flow.

The second section 358 defines the portion of the outer surface 344 in which the radial dimension 364 can vary along the longitudinal axis 310, e.g., from the first section 356 towards the bottom 324 of the extension member 342. The second section 358 extends along the longitudinal axis 310 a distance that requires the plug element 308 (FIG. 5) to move farther (away from the seat element) before the Venturi flow begins to form. At this position, the plug element 308 (FIG. 5) is far enough from the seal element 306 (FIG. 5) so that the cyclic opening and closing (or "buzzing") is unlikely to occur during low-flow conditions.

Reductions in the radial dimension 364 in the second section 358 can cause the outer surface 344 to slope and/or taper toward the longitudinal axis 310. The slope can define a gradual change in the profile of the extension member 342, e.g., wherein the outer surface 344 forms a curvilinear surface from a first point to a second point closer to the bottom 324 than the first point. The first reduced diameter section 360 embodies one example of the gradual change in the profile. This section helps to slow (or reduce the velocity of) the flow of the working fluid, thereby changing the fluid dynamics to prevent Venturi flow from developing as the plug element 308 (FIG. 5) moves from the first position to another position along the longitudinal axis 310.

The slope can also define an abrupt change in the profile of the extension member 342, e.g., wherein the outer surface 344 forms a chamfer and/or linear surface from a first point to a second point closer to the bottom 324 of the first point. The second reduced diameter section 362 embodies one example of the abrupt change in the profile. This section provide alignment and/or can help guide the plug retainer 308 (FIG. 5) into position in the seat element 306 (FIG. 5) during operation of the valve device 300. For example, during normal operation, the plug retainer 308 (FIG. 5) may move to a position so the extension member 342 is wholly outside of the seat element 306 (FIG. 6). This position often occurs when the valve device 300 is fully open, e.g., to satisfy extensive downstream demand.

Reductions in this downstream demand will allow the plug element 308 (FIG. 5) to returns to its closed position. The second reduced diameter section 362 provides a lead-in surface to the seat element 306 (FIG. 5) should the plug element 308 (FIG. 5) become misaligned during the transit back to closed position. In one implementation, the extension member 342 will first contact the lip 336. The lead-in surface allows the lip 336 to effectively slide against the outer surface 344, thereby avoiding situations where the plug element 308 (FIG. 5) becomes stuck on the lip 336 and, therefore, unable to reach its closed position.

Figure 8:
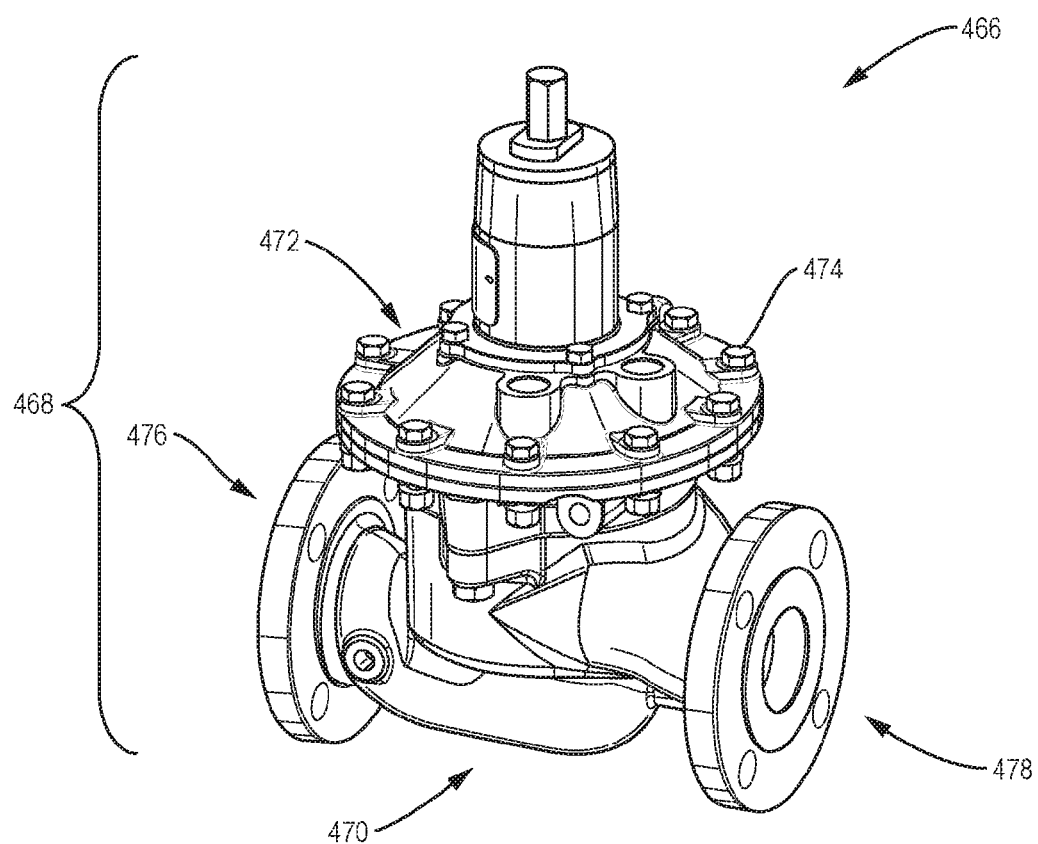
FIG. 8 depicts a perspective view of an example of a fluid coupling.

FIG. 8 illustrates an example of a fluid coupling 466 that can incorporate a valve device (e.g., valve devices 100, 200, 300 of FIGS. 1, 2, 3, 4, and 5). Examples of the fluid coupling 466 find use in oil and gas industries for coupling pipes together. However, the concepts of the present disclosure, i.e., the features of the valve devices above, can find use in any number of industries that transport and/or transit fluids (e.g., gas and liquid) from one place to another. At a relatively high level, the fluid coupling 466 includes housing 468 with a fluid transport section 470 and a cover 472 that secure to the fluid transport section 470 via one or more fasteners 474. The fluid transport section 470 has a pair of inlet/outlets (e.g., a first inlet/outlet 476 and a second inlet/outlet 478). The inlet/outlets 476, 478 can secure to pipes and conduits to allow ingress and egress of fluids to the fluid transport section 470.

Figure 9:
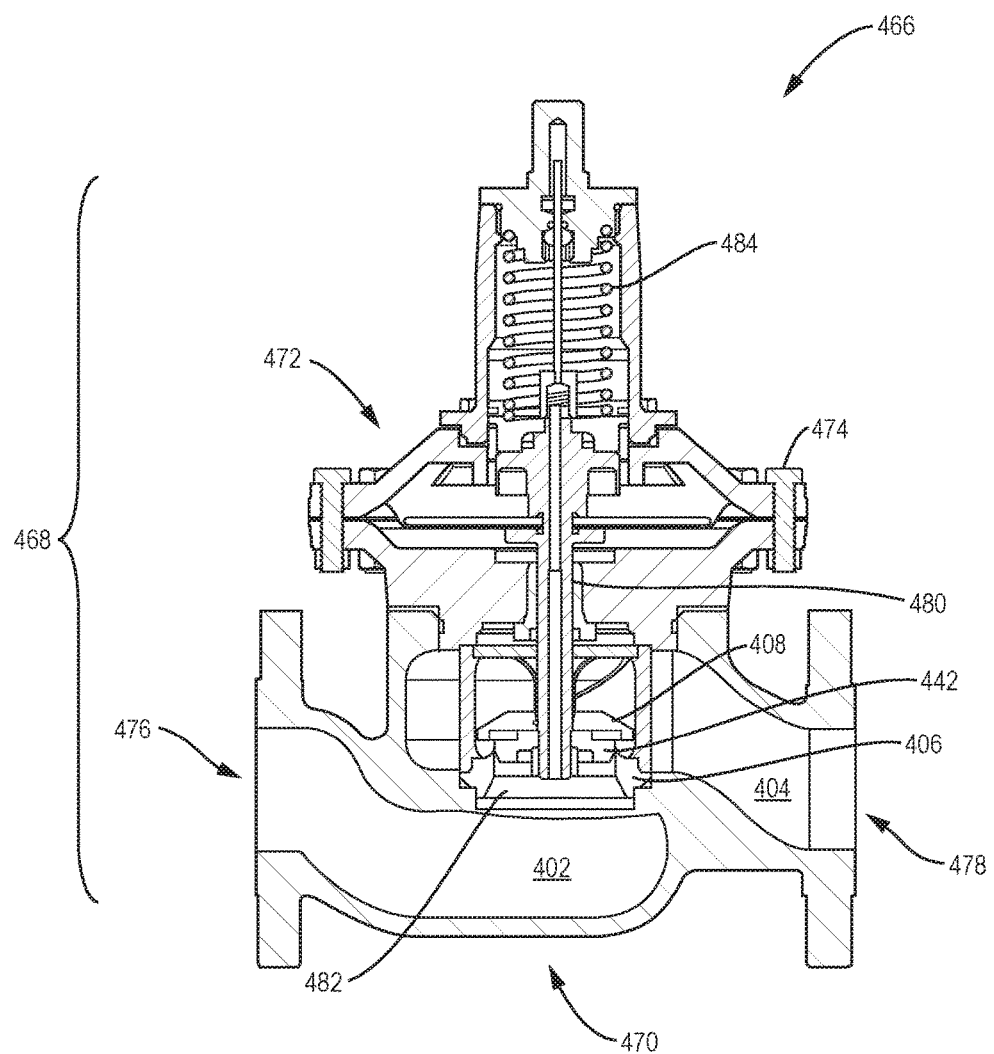
FIG. 9 depicts a cross-section view of the fluid coupling of FIG. 8.

As best shown in FIG. 9, which is a cross-section of the fluid coupling 466 taken at line A-A, the valve device includes a seat element 406 (e.g., plug element 306 of FIGS. 5, 6, and 7) and a plug element 408 (e.g., plug element 308 of FIGS. 5, 6, and 7). The valve device also includes a stem 480 and a nut 482. The stem 480 extends through the plug element 408. The nut 482 engages the stem 480 on the downstream side of the plug element 408. In one example, the extension member 442 includes a recess (also "counterbore") in which the nut 482 resides when secured in position. The valve device 400 also includes a force element 484, in this case a coil spring, that applies a force onto the stem 480. Examples of the force element 484 maintain the valve device in its closed position until the pressure of the fluid on the upstream side 402 of the valve device 300 overcomes the force to cause the valve device to open.

In view of the foregoing discussion, use of the valve device in the fluid coupling 466 can reduce noise that results from cyclic opening and closing of the valve during low flow conditions. Applying one or more of the proposed design features, the valve device can change the fluid dynamics of the working fluid that transits the fluid coupling 466. The changes in fluid dynamics prevent pressure differentials due to Venturi flow effects that can occur at the interface of the seat element 406 and the plug element 408.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve device, comprising:
    a seat with an aperture forming an inner aperture surface, the seat having a top with a lip forming a rounded surface that circumscribes the aperture; and
    a plug moveable relative to the seat to a first position at which a contact surface of the plug contacts the rounded surface, the plug comprising an extension member in contact with the contact surface and configured to fit into the aperture at the first position,
    wherein the extension member forms a bottom of the plug, has a central axis, and has an outer surface with a profile wholly disposed in the aperture at the first position, the profile having a first section parallel to the inner aperture surface that reduces the aperture to an area that is 2% or less of its original size, the first section gives way to a second section that tapers toward the central axis that gives way to third section that tapers toward the central axis and terminates at the bottom of the plug.

2. The valve device of claim 1, wherein the contact surface is disposed radially outside of the extension member.

3. The valve device of claim 1, further comprising a seal disposed on the plug, wherein the seal forms the contact surface that is configured to contact the rounded lip of the seat at the first position.

4. The valve device of claim 3, wherein the seal forms a ring disposed about a portion of the extension member.

5. The valve device of claim 1, wherein the inner aperture surface is adjacent the rounded surface.

6. The valve device of claim 1, wherein the aperture has a diameter that varies in a direction from the top to the bottom of the seat.

7. The valve device of claim 1, wherein the profile in the third section forms a chamfer.

8. The valve device of claim 1, wherein the extension member is formed monolithically with the plug.

9. The valve device of claim 1, wherein the extension member is separable from the plug.

10. The valve device of claim 9, further comprising a valve stem that extends through the plug and out of the bottom of the extension member.

11. A fluid coupling, comprising:
    a housing having a pair of inlet/outlets;
    a valve device in flow connection with the pair of inlet/outlets, the valve device comprising a plug, a seat, and a seal, the seat forming an aperture forming an inner aperture surface, the seat having a top with a lip forming a rounded surface protruding toward the plug, the plug having a seat portion extending toward the seat, and the seal set into the plug and circumscribes at least part of the seat portion so as to contact the lip with at least part of the seat portion located in the aperture,
    wherein the plug is configured to move relative to the seat to a first position to locate a contact surface in contact with the rounded surface of the lip to fit the boss into the aperture, and
    wherein the seat portion of the plug forms a bottom of the plug, has a central axis, and has an outer surface with a profile wholly disposed in the aperture at the first position, a first section gives way to a second section that tapers toward the central axis that gives way to a third section that tapers toward the central axis and terminates at the bottom of the plug.

12. The fluid coupling of claim 11, wherein the inner aperture surface is formed adjacent the rounded lip.

13. The fluid coupling of claim 11, further comprising:
    a stem extending through the plug;
    a nut disposed on the stem; and
    a force element coupled with the stem so as to apply a force onto the stem to locate the plug in a closed position.

14. The fluid coupling of claim 13, wherein the inner aperture surface has a portion of uniform diameter extending from the rounded lip, and wherein at least part of the boss overlaps with the portion of uniform diameter in the closed position to locate the first section proximate the portion of uniform diameter.

15. The fluid coupling of claim 13, wherein the plug comprises a plurality of parts, each formed separately and coupled with one another via the stem and the nut, and wherein one of the plurality of parts forms the seat portion.

16. The fluid coupling of claim 13, wherein the profile in the third section forms a chamfer.

17. The valve device of claim 11, wherein the seat portion is separable from the plug.

18. An assembly, comprising:
    a plug element comprising a retainer, an extension member forming a boss that extends into the retainer, and a seal set into the retainer and at least partially surrounding the boss, the seal having an exposed surface extending radially outwardly of the boss; and
    a seat element having a top, a bottom, and an aperture having a diameter that is larger than the diameter of the boss, the top forming a lip with a rounded surface that circumscribes the aperture,
    wherein the plug element and the seat element are configured to cooperate with one another to prevent flow of a fluid in a valve with the exposed surface in contact with the rounded surface, and
    wherein the extension member forms a bottom of the plug, has a central axis, and has an outer surface with a profile wholly disposed in the aperture at a first position, the profile having a first section parallel to the central axis that gives way to a second section that tapers toward the central axis that gives way to a third section that tapers toward the central axis and terminates at the bottom of the plug.

19. The assembly of claim 18, wherein the profile in the third section forms a chamfer.

20. The assembly of claim 18, wherein the boss is separable from the plug.

* * * * *